Aug. 17, 1965     H. J. VOELKER ETAL     3,200,705
                  TRAFFIC SAFETY DEVICE
Filed Aug. 13, 1962                       2 Sheets-Sheet 1
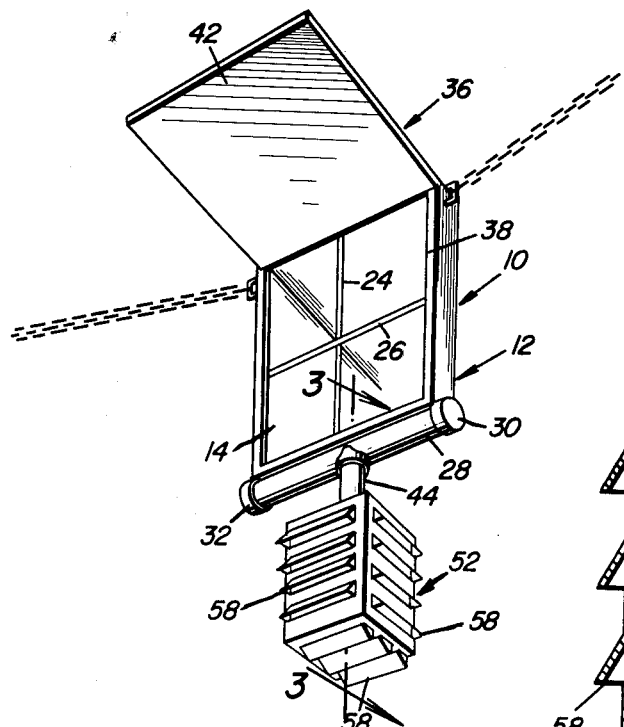
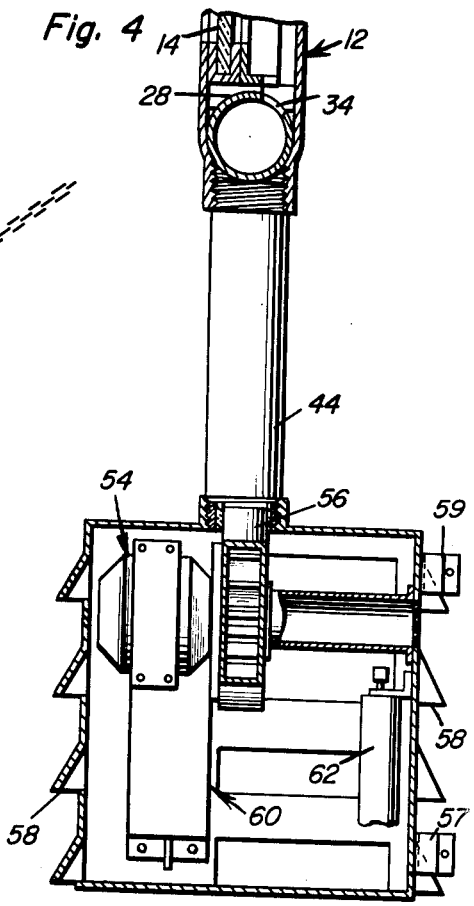
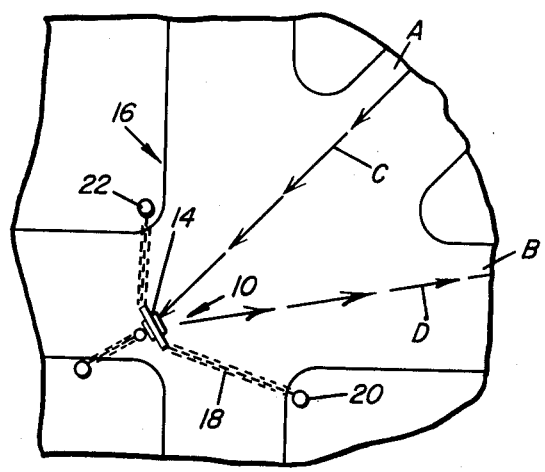
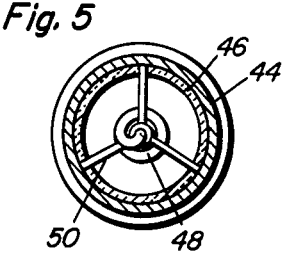
Henry J. Voelker
Henry J. Otnott
          INVENTORS.
BY *Clarence A. O'Brien*
*and Harvey B. Jacobson*
                    Attorneys

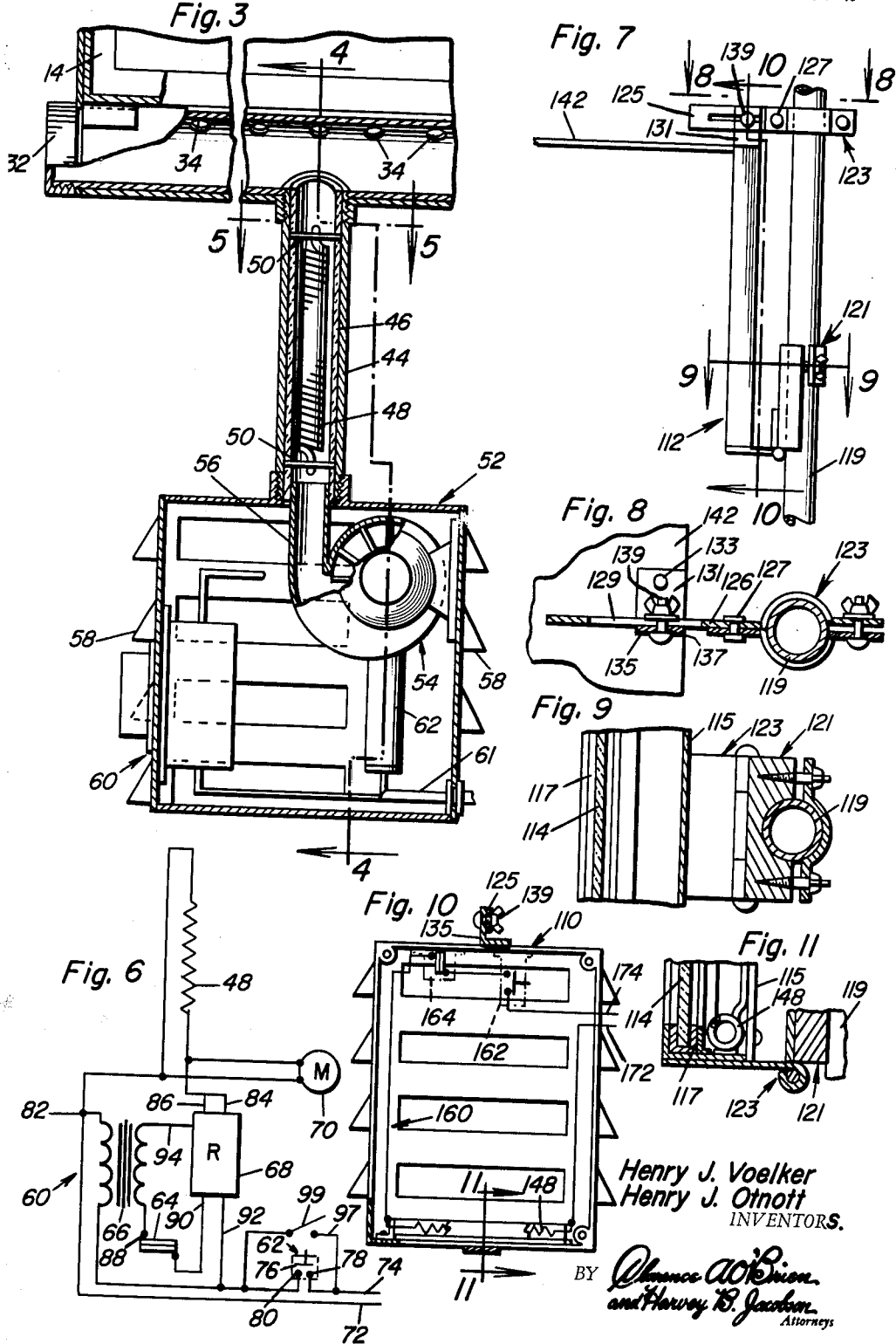

United States Patent Office 3,200,705
Patented Aug. 17, 1965

3,200,705
TRAFFIC SAFETY DEVICE
Henry J. Voelker, 2564 Prentiss Ave., New Orleans 22, La., and Henry J. Otnott, 7018 Jeannette Place, New Orleans 18, La.
Filed Aug. 13, 1962, Ser. No. 216,499
3 Claims. (Cl. 88—78)

This invention relates to a novel and useful traffic safety device and more specifically to a mirror assembly which is to be mounted in an intersection with the mirror disposed in such a manner that the driver of a vehicle approaching the intersection from one direction may see the image of a vehicle approaching the intersection from another direction.

The mirror assembly of the instant invention includes an upright mirror and means defining at least one guide line on the mirror extending thereacross. The mirror assembly is mounted in a manner such that the image of the vehicle approaching the intersection from the other direction will register with a guide line formed on the mirror as the vehicle reaches a point a predetermined distance from the intersection. In addition, the mirror assembly of the instant invention includes means for heating the mirror to prevent the formation of ice thereon in cold wet weather and also for preventing the condensation of water vapors thereon when the temperature of the ambient air drops to a point near the dew point. Still further, the mirror assembly of the instant invention is also provided with a shield including a laterally directed top wall, which projects forwardly of and shields the upright mirror of the mirror assembly from the elements.

The main object of this invention is to provide a mirror assembly constructed in such a manner that the formation of ice and the condensation of water vapor thereon may be prevented.

A further object of this invention, in accordance with the immediately preceding object, is to provide a mirror assembly having an upright mirror with means thereon defining a guide line which may be used as a reference line to indicate when a vehicle approaching an intersection controlled by the mirror assembly of the instant invention reaches a point a predetermined distance from the intersection.

Yet another object of this invention is to provide a mirror assembly in accordance with the preceding objects including means adapted to mount the mirror assembly from a support in such a manner so that the mirror of the mirror assembly may be adjustably positioned about substantially vertically and horizontally disposed axes relative to the support member to which the mirror assembly is secured.

A still further object of this invention, in accordance with the immediately preceding object, is to provide means for heating the mirror of the mirror assembly in order to prevent the formation of ice and the condensation of water vapor thereon.

A further object of this invention is to provide a control for the heating means of the mirror assembly which includes means responsive to predetermined temperature and humidity conditions for actuating the heating means.

A final object to be specifically enumerated herein is to provide a mirror assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic top plan view of an intersection showing the manner in which the mirror assembly of the instant invention may be mounted in order that the driver of a vehicle approaching the intersection from one direction may see the image of a vehicle approaching the intersection from another direction;

FIGURE 2 is a perspective view of the mirror assembly;

FIGURE 3 is an enlarged fragmentary vertical sectional view taken substanially upon the plane indicated by section line 3—3 of FIGURE 2 with parts of the mirror assembly being broken away;

FIGURE 4 is a fragmentary vertical view taken substantially upon a plane indicated by section line 4—4 of FIGURE 3;

FIGURE 5 is an enlarged horizontal sectional view taken substantially upon a plane indicated by section line 5—5 of FIGURE 3;

FIGURE 6 is a diagrammatic view of the wiring circuit of the mirror assembly;

FIGURE 7 is a side elevational view of a modified form of the mirror assembly;

FIGURE 8 is an enlarged fragmentary horizontal sectional view taken substantially upon a plane indicated by section line 8—8 of FIGURE 7;

FIGURE 9 is an enlarged fragmentary horizontal sectional view taken substantially upon the plane indicated by section line 9—9 of FIGURE 7;

FIGURE 10 is a vertical sectional view taken substantially upon a plane indicated by section line 10—10 of FIGURE 7; and FIGURE 11 is an enlarged fragmentary vertical sectional view taken substantially upon a plane indicated by section line 11—11 of FIGURE 10.

Referring now more specifically to FIGURES 1 through 6 in the drawings there will be seen the mirror assembly of the instant invention which is generally referred to by the reference numeral 10. The mirror assembly 10 includes an upright housing generally referred to by the reference numeral 12 in which there is mounted an upright mirror 14.

With attention now directed to FIGURE 1 of the drawings it will be seen that the mirror assembly 10 is mounted in an elevated position above an intersection generally referred to by the reference numeral 16. Streets A and B converge at the intersection and the mirror assembly 10 is supported in an elevated position by means of a tension member 18 suspended between two uprights 20 and 22 on opposite sides of the intersection. The mirror assembly 10 may be suspended from the tension member 18 in any convenient manner and is disposed in a manner such that the driver of a vehicle approaching the intersection along a line designated by the arrows C will be able to view an image of street B as seen from the mirror assembly 10 and along the line designated by the arrows D.

It will be noted that the mirror 10 is disposed in direct alignment with a vertical plane extending along the center of the right hand side of street A looking toward the intersection 16. However, the mirror 10 is disposed such that the line D cuts slightly diagonally across the right hand side of street B as seen approaching the intersection 16.

The mirror 14 includes a reflective strip 24 defining a vertical line across the mirror 14 as well as a reflective strip 26 defining a horizontal line across the mirror 14. As the driver of a vehicle moving along the right hand side of street A toward the intersection 16 views the oncoming traffic on street B, as the oncoming traffic moves from a point a great distance from the intersection 16 to a point immediately adjacent the intersection 16 the image will move horizontally across the mirror 14. It is to be understood that the reflective strip 24 is positioned on the mirror 14 in such a manner that the image of the traffic approaching intersection 16 along street B as seen by the driver of a vehicle approaching the intersection 16 along street A will register with the vertical line defined by the reflective strip 24 as the vehicle approaching on street B reaches a point a predetermined distance from the intersection 16. If the image of the vehicle approaching on street B as seen by the driver of a vehicle approaching the intersection 16 on street A has not yet crossed the line defined by the reflective strip 24, the driver of the vehicle approaching the intersection 16 on street A will know that the vehicle approaching on street B is a distance from the intersection sufficient to enable the driver of the vehicle approaching the intersection 16 on street A to enter and cross the intersection without being in danger of having a collision with the vehicle approaching the intersection on street B.

In addition, the mirror 14 may be disposed relative to the intersection so as to enable the driver of one vehicle to view the image of a second vehicle approaching from another direction only when the second vehicle approaching from another direction only when the second vehicle is too close to the intersection to enable the driver of the first vehicle to safely enter the intersection. Further, inasmuch as some streets rise to drop away from an intersection, the reflective strip 26 may be used in the same manner to give an indication of the distance of a vehicle from the intersection whose image may be seen in the mirror 14.

With attention now directed to FIGURES 2 through 6 of the drawings, it will be seen that the lower end of the upright housing 12 rotatably receives a transversely extending header pipe 28 which may be secured in adjusted rotated positions by means of end caps 30 and 32 threadedly engaged with the opposite ends of the header pipe. The header pipe 28 has a plurality of apertures 34 formed at longitudinally spaced points in its upper surface.

The mirror asembly 10 also includes a hood construction generally designated by the reference numeral 36 and the hood construction 36 includes a top wall 42. The top wall 42 projects laterally outwardly away from one side of the upright housing 12 and shields the mirror 14 from direct sunlight as well as from rain and snow.

A cylindrical support is dependingly supported from the header pipe 28 and has its upper end communicated with the central portion of the header pipe 28. The cylindrical support 44 is lined with a cylinder of heat insulative and dielectric material which is referred to by the reference numeral 46 and the opposite ends of a heating element 48 are supported from rods 50 constructed of dielectric material secured across the cylindrical liner 46. A control housing generally referred to by the reference numeral 52 is supported from the lower end of the cylindrical support 44 and has a blower assembly generally referred to by the reference numeral 54 mounted therein having its outlet 56 communicated with the lower end of the interior of the sleeve or liner 46 for the purpose of blowing air over the heating element 48, up into the header pipe 28 and out through the apertures 34.

The control housing 52 is provided with louvered air inlets 58 and also with a control assembly generally referred to by the reference numeral 60 which is electrically actuated and receives its current from an electrical lead-in cable 61.

It may be seen from FIGURE 6 of the drawings that the control assembly includes a humidistat 62, a thermostat 64, a transformer 66, a double acting relay assembly 68, the heating element 48 and an electric motor 70 for actuating the blower assembly 54. The lead-in cable 61 includes conductors 72 and 74 and it may be seen that the humidistat 62 is disposed in the conductor 74 and includes a bridging element 76 for completing the circuit between the spaced terminals 78 and 80 of the conductor 74. The conductor 72 has a terminal 82 of the transformer 66 connected thereto and the heating element 48 is disposed in the conductor 72. In addition, the electric motor 70 is connected in parallel to the conductor 72 before the conductor 72 branches to form separate conductors 84 and 86 leading to a pair of points (not shown) within the double relay 68. The thermostat 64 is connected to the transformer 66 as at 88 and to the double relay 68 by means of conductor 90. The relay 68 is also connected to the conductor 74 by conductor 92 and it is to be understood that a coil is disposed in the conductor 90 within the double relay which is in turn connected to the transformer 66 by means of the conductor 94. A pair of movable contacts are connected to the conductor 92 and actuated by means of the coil disposed in the conductor 90 whereupon if the required percentage of humidity is not present, the humidistat bridging element 76 will remain open. If the required percentage of humidity is present, the bridging element 76 will bridge the contacts 78 and 80 and pass current to the transformer 66. The transformer will then effect a current flow to the thermostat 64. If the temperature is within the set range of the thermostat 64, its mercury switch will be closed and pass current through the relay whereby the heater motor 70 and heating element 48 will be actuated. It is to be understood that the humidistat 62 and the thermostat 64 are adjustable and that they would be adjusted so as to reflect operation of the heating element 48 and the blower motor 70 only when the temperature dropped close to the dew point. Further, the by-pass circuit 97 having a control switch 99 disposed therein may be used to override the humidistat 62 and bridge the contacts 78 and 80. In addition, a timing mechanism may be utilized wherein the blower element 70 and heating element 48 will operate intermittently, being on for thirty to thirty-five seconds and off for two to five minutes or more depending on the relative humidity of the ambient atmosphere. However, in most cases proper adjustment of the thermostat alone should be sufficient to cause economical intermittent operation of the blower assembly and heating element.

It will be noted that the heating element 48 is disposed below the mirror 14 and that even if the blower assembly 54 were not present that air would be passed upwardly through the control housing 52 and into the header pipe 28 by means of convection currents.

With attention now directed to FIGURES 7 through 11 of the drawings, there will be seen a modified form of mirror assembly generally referred to by the reference numeral 110 which includes a housing generally referred to by the reference numeral 112. The housing 112 also includes a hood generally referred to by the reference numeral 136 which is very much like the hood 36.

A mirror 114 is mounted within the upright housing 112 a spaced distance forwardly of the rear wall 115 of the housing 112 with the peripheral edge portions of the mirror 114 being received in complementary channel members 117. An upright post 119 is provided as a support for the mirror assembly 110 and a clamp assembly generally referred to by the reference numeral 121 is clamped to the post 119 and is pivotally secured to the lower end of the housing 112 by means of a hinge assembly 123. It will be noted that the clamp 121 is constructed in a manner such that the mirror assembly 110 may be rotated about the longitudinal axis of the post 119. A second clamp assembly generally referred to by the reference numeral 123 is carried by the post 119 adjacent the top of the mirror assembly 110 and has one end of a connecting link 125 pivotally secured thereto by means of a pivot pin 127. The clamp assembly 123 may also be adjustably positioned by the longitudinal axis of the post 119 and the free end of the connecting link 125 has a longitudinal slot 129 formed therein. A bracket 131 is secured to the top wall 142 of the hood 136 by means of a suitable fastener 133 and includes an upstanding leg portion 135 which is suitably apertured as at 137 for the reception of a fastener 139 which is passed through the aperture 137 and the slot 129. In this manner, the mirror assembly 110 may be swung about a horizontal axis defined by the hinge 123 and may be adjustably positioned about the longitudinal axis of the upstanding post 119. Accordingly, it may be seen that the mirror 114 of the mirror assembly 110 may be adjustably positioned as desired relative to a permanent support post 119.

With attention now directed to FIGURE 10 of the drawings it may be seen that the mirror assembly 110 also includes a humidistat 162 and a thermostat 164. A pair of conductors 172 and 174 provide current for the control assembly 160 of the mirror assembly 110 which includes a heating element 148. The heating element 148 is disposed in series within the conductor 172 and the humidistat and thermostat 164 disposed in series within the conductor 174. Accordingly, when the thermostat switch is closed and the humidistat switch is closed, current will be passed through the heating element 148 which is disposed immediately behind the lower edge of the mirror 114, see FIGURES 10 and 11. Accordingly, it may be appreciated that the control assembly 160 of the mirror assembly 110 may be actuated in a manner similar to the manner in which the control assembly 160 is actuated.

If it is desired, the mirror assemblies 10 and 110 may be supported from a post such as post 119 even if the latter is suspended from a tension member such as tension member 18. Further, the housing 52 may also be fixedly supported from a post similar to post 119 independently of the mirror assembly 10 and by means of the brackets 57 and 59, see FIGURE 4. In addition, the mirror assemblies may each be provided with a slightly convexed mirror rather than a plane mirror and each mirror assembly may also include a plurality of mirrors angularly disposed relative to one another.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a road intersection defined by the intersection of two angularly disposed streets, a mirror assembly including a mirror having a generally flat and planar reflecting surface, said assembly including means defining at least one guide line extending substantially completely across said reflecting surface, means mounting said mirror assembly in an elevated position generally above the apex formed by the intersection of said streets with said mirror disposed such that a first line perpendicular to its reflecting surface is slightly acutely angulated relative to a second line bisecting the included angle defined by said streets whereby the driver of a first vehicle approaching the intersection on one street may view the approach of a second vehicle toward the intersection on the other street and the image of the second vehicle viewed by said driver will register with said line when said second vehicle is at a predetermined distance from said intersection.

2. The combination of claim 1 wherein said mirror assembly includes means for heating said mirror to prevent the formation of ice thereon.

3. The combination of claim 2 wherein said means for heating said mirror also includes control means responsive to predetermined temperature and humidity conditions approaching the dew point for actuating said heating means.

References Cited by the Examiner

UNITED STATES PATENTS

| | | | |
|---|---|---|---|
| 1,311,253 | 7/19 | Stern | 88—81 |
| 1,836,649 | 12/31 | Damm | 96—2 |
| 1,849,419 | 3/32 | Coppel | 88—79 |
| 1,856,124 | 5/32 | Austin | 219—209 |
| 1,933,220 | 10/33 | Petree | 219—364 |
| 2,717,957 | 9/55 | Ohlheiser | 236—44 X |
| 2,796,506 | 6/57 | Lumbert | 219—219 |
| 2,797,287 | 6/57 | Prutzman | 219—219 |
| 2,803,733 | 8/57 | Kashirsky | 219—219 |

FOREIGN PATENTS

| | | |
|---|---|---|
| 133,575 | 2/51 | Sweden. |
| 336,186 | 10/30 | Great Britain. |
| 510,072 | 2/55 | Canada. |
| 1,208,059 | 9/59 | France. |

RICHARD M. WOOD, *Primary Examiner.*